United States Patent

Johnston

Patent Number: 5,857,424
Date of Patent: Jan. 12, 1999

[54] POSITION-ADAPTOR FOR MILKING MACHINE INFLATIONS

[75] Inventor: Garry Johnston, Linden, Mich.

[73] Assignee: Barbara M. Burns, Ann Arbor, Mich.

[21] Appl. No.: 931,339

[22] Filed: Sep. 16, 1997

Related U.S. Application Data

[60] Provisional application No. 60/027,134 Oct. 2, 1996.

[51] Int. Cl.[6] .................................. A01J 7/00; A01J 5/00
[52] U.S. Cl. ...................................... 119/14.47; 119/14.02
[58] Field of Search ............................. 119/14.47, 14.48, 119/14.49, 14.5, 14.51, 14.52, 14.53

[56] References Cited

U.S. PATENT DOCUMENTS

| | | | |
|---|---|---|---|
| 952,122 | 3/1910 | Lane | 119/14.47 |
| 1,015,032 | 1/1912 | Lane | 119/14.47 |
| 1,236,036 | 8/1917 | Anderson | 119/14.48 |
| 1,260,466 | 3/1918 | Sharples | 119/14.49 |
| 2,340,295 | 2/1944 | Bender | 119/14.53 |
| 3,324,830 | 6/1967 | McAndrew | 119/14.52 |
| 3,485,212 | 12/1969 | McAndrew | 119/14.49 |
| 3,967,587 | 7/1976 | Noorlander | 119/14.49 |
| 4,269,143 | 5/1981 | Erbach | 119/14.49 |
| 4,315,480 | 2/1982 | Norlander | 119/14.49 |
| 4,372,250 | 2/1983 | Larson | 119/14.49 |
| 4,425,872 | 1/1984 | Mills | 119/14.47 |
| 5,007,378 | 4/1991 | Larson | 119/14.47 |
| 5,161,482 | 11/1992 | Griffin | 119/14.02 |
| 5,224,442 | 7/1993 | Davies | 119/14.49 |

FOREIGN PATENT DOCUMENTS

| | | |
|---|---|---|
| 117307 | 7/1918 | United Kingdom . |
| 2272826 | 6/1994 | United Kingdom . |

Primary Examiner—Thomas Price
Assistant Examiner—James S. Bergin
Attorney, Agent, or Firm—Barbara M. Burns

[57] ABSTRACT

A device for positioning a milking machine inflation onto an animal's teat. The device is rubber and has an opening through the device. The device fits over the head of an inflation with the inflation head stopping at an inflation plate inside the device. The inflation with device is positioned over the animal's teat near the udder. The device spaces the inflation from the udder, thus preventing creep of the inflation up the teat and the resultant pinching of the milk canal. Flexible tabs can be provided to the spacer to retain the spacer on the teat. Clip or clips can be provided to hold the device onto the inflation. The device is external to the inflation and is easily removed after milking is completed. The device is easily transferable to another inflation.

11 Claims, 2 Drawing Sheets

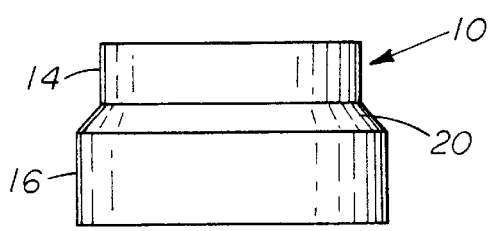
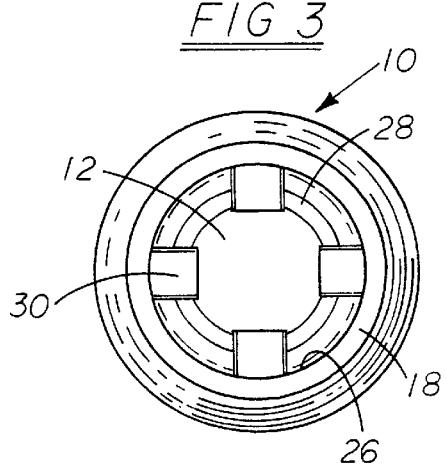
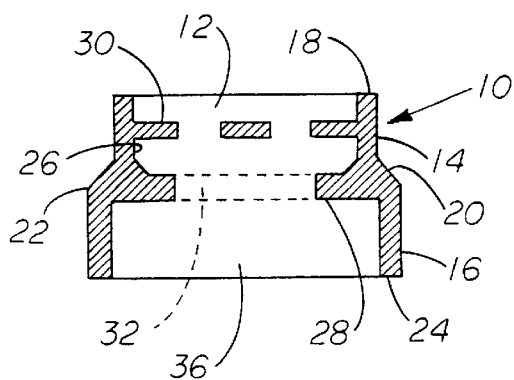
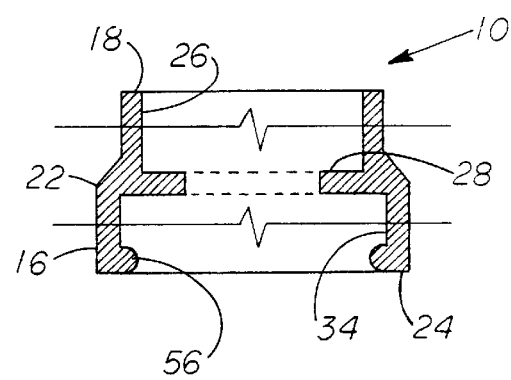

POSITION-ADAPTOR FOR MILKING MACHINE INFLATIONS

REFERENCE TO RELATED APPLICATION

This application is based on provisional patent application 60/027,134, filed Oct. 2, 1996.

BACKGROUND OF THE INVENTION

The field of the invention pertains to milking machine inflations, specifically to a device to position and maintain milking machine inflations lower on teats so as to maintain good milk flow.

For automatic milking, teat cups are fittable to the animal's teat for the removal of the milk from the udder through the teat. Teat cups conventionally used in most milking machines are formed from a flexible (usually rubber) inflation or liner emplaced inside a rigid shell to which an operating vacuum is supplied. The vacuum rhythmically pulsates from a milking to a resting stage, and thus stimulates the animal to let down the milk through the teat. Inflations used in teat cups of milking machines generally function as intended by milking out the teat completely in a timely manner.

There are some teats, however, that do not milk out well when the teat cup is attached. Because of the flexibility of the inflations and the massaging action during milking, the vacuum or suction tends to make the inflation move up on the teat. As the inflation head moves closer to the udder, the peripheral edge of the teat receiving opening tends to pinch the milk canal thus restricting the flow of milk. This is especially common with teats abnormally sized or shaped because of infection, injury, or inherited defects. The result is longer milking time and possible incomplete milkout which can lead to sore teat ends and possibly mastitis. A severe infection can even lead to permanent loss of milk production in that particular quarter.

This pinching effect is also particularly problematic with animals having a small milk or streak canal near the udder due to genetics or to an injury. A severe infection can even lead to permanent loss of milk production in that particular quarter of the udder.

To cull a dairy cow that is slow or difficult to milk because of teat abnormalities such as those mentioned above, is sometimes not an option. The cow may be a high producer and have excellent breeding qualities, therefore, being of too much value to the herd.

Although the need for a device to prevent pinching of the milk canal existed, no effective device was known. Thus the need for a device to positively position a milk inflation to prevent milk canal pinching, yet facilitate a steady and more rapid milkout of these special teats. Further, the need existed for a device to be easily attached and removed from an inflation.

Various forms of milking inflations and milking teat cups have been devised in an attempt to solve this problem. Examples of the known art are shown in the following United States Patents: U.S. Pat. No. 3,324,830 to McAndrew for an anti-creep adaptor for milking machine inflation; U.S. Pat. No. 3,485,212 to McAndrew for an anti-creep adaptor for milking machine inflation; U.S. Pat. No. 3,967,587 to Noorlander for a teat cup inflation; U.S. Pat. No. 4,269,143 to Erbach for a teat cup assembly; U.S. Pat. No. 4,315,480 to Noorlander for teat cups for milking machines; U.S. Pat. No. 4,372,250 to Larson for milking inflation; U.S. Pat. No. 4,425,872 to Mills for milking inflations; U.S. Pat. No. 5,007,378 to Larson for milking machine teat cup assembly; U.S. Pat. No. 5,161,482 to Griffin for automatic milking apparatus; U.S. Pat. No. 5,224,442 to Davies for milking apparatus; and United Kingdom Patent Number 117,307 to Robertson for improvements in milking machine teat cups; and United Kingdom Patent Number 2,272,826 to Grindal for teat cup liners.

The McAndrew '830 patent teaches an anti-creep adaptor for milking machine inflation that fits into the top of the inflation; the McAndrew '212 patent shows another anti-creep adaptor that fits into the top of the inflation that has inserts that may be screwed in; the Noorlander '587 patent describes an inflation to prevent teat slip in the teat cup, the teat opening of the inflation of the Noorlander '587 patent can have a corrugated edge; the Erbach patent teaches an inflation assembly that can be assembled without special tools and has a smooth flow surface to reduce flow back; the Noorlander '480 patent discusses a diaphragm to prevent the teat cup from falling off at the end of the milking process, the Larson patent '250 patent teaches an inflation that has a head end portion resists inward and outward deflection from its original position; the Mills patent shows two different sized barrel sections in the inflation to limit creep; the Larson '378 patent describes a liner cuff with an annular sleeve; the Griffin patent shows a regulator device which maintains the teat cup at atmospheric pressure; the Davies patent teaches an inflation with a reduced tendency to twist; the United Kingdom patent to Robertson discusses a lengthening ring fitting into and for lengthening the inflation for a long teat; and the United Kingdom patent to Grindal shows a teat cup liner with an upper and a lower section adapted to encircle the teat.

Although some of these patents deal with anti-creep of the inflation, none describe an easily attachable and removable device that fits over the outside of the inflation head.

SUMMARY OF THE INVENTION

It is an object of the invention to provide a device that can be readily attached to and removed from an inflation for teats that are prone to pinching of the milk canal.

It is an object of the invention to provide a device that fits over the inflation head.

It is a further object of the invention to provide an external device that is used as required.

The invention comprises a device or inflation spacer for placing over a milking inflation to be used on an animal's teat. The device or spacer positions and controls the position of the milking inflation on the animal's teat. The device not only fits over the milking inflation, the device rises above the milking inflation to space the milking inflation lower on the teat. The device rests against the udder and spreads apart the milk canal. The milking inflation is positioned significantly downward on the teat away from the udder by the device. The attachment and removal of the device is accomplished in a convenient and quick manner. Thus the task of milking a special animal is made easy and more consistent.

The device of the invention has a body portion an upper body and a lower body. An aperture runs through both the body portions from one end to the other. Inside the body near the first end, a plate or inflation plate extends perpendicularly partway into the aperture, but the aperture is maintained at a size consistent with the size of a teat.

Inside the device near the second end, a number of flexible tabs can extend into the aperture. The flexible tabs are positioned in the aperture between the inflation plate and the second end. Inside the body portion near the first end, the body has an internal measurement to fit over the end of an inflation. The inflation is placed into the body and the head of the inflation touches the inflation plate.

The body portion near the second end has a height measurement from the second end to the inflation plate in order to place the inflation head at a desirable distance from the udder.

The body portion can have circumferential configurations on the parts near the first end and the second end with an angled connecting portion or midpoint flange therebetween if the circumferential configurations are different sizes. Clip or clips at the lower edge can hold the inflation spacer on the inflation head An inflation spacer of the present invention facilitates a steady and more rapid milkout of the problem teats without holding down on the teat cup or inserting milktubes or dilators into the milk canal. This eliminates possible infection in the udder from contaminated equipment.

The inflation spacer is formed from a semi-flexible rubber that is compatible with the type used in manufacturing milking inflations. It must be of a thickness enabling it to maintain its shape and not collapse from vacuum when in operative position. The spacer being formed of semi-flexible rubber allows it to seal tightly with the inflation head and udder to maintain the milking vacuum. The material for the inflation spacer is of rubber and preferably of a chemical resistant rubber.

In operation, as the teat passes through the spacer tabs and the teat receiving opening of the device, the tabs are pressed downwardly with moderate pressure against the sides of the teat. The tabs hold the spacer on the teat after the vacuum is shut off and the teat cup is manually or automatically removed. While not applying enough pressure to interfere with the flow of milk during the milking process, the tabs do exert sufficient pressure to hold the spacer on the teat until it is removed by hand with a slight downward pull. In place of the tabs to hold the device on the teat, a clip or clips can be provided at the lower edge to hold the inflation spacer on the inflation head.

The purpose of the inflation spacer is to position the inflation lower on the teat so as to prevent the peripheral edge of the inflation teat-receiving opening from pinching the milk canal, thus restricting milk flow. Two important features of the spacer make this possible. First, is the length of the upper body wall which keeps the inflation spaced lower on the teat. The second feature is the large central bore of the spacer that fits easily over various teat sizes and allows the milk canal to remain fully open and facilitate more rapid milk flow. This is accomplished because the large cylindrical upper rim has more contact area with the udder.

For a more complete understanding of the present invention, reference is made to the following detailed description when read with in conjunction with the accompanying drawings wherein like reference characters refer to like elements throughout the several views, in which:

BRIEF DESCRIPTION OF THE DRAWINGS

FIG. 1 illustrates a side elevational view of the inflation spacer according to the preferred embodiment of the invention;

FIG. 2 illustrates a cross-sectional view of the inflation spacer of FIG. 1;

FIG. 3 illustrates a top plan view of the inflation spacer of FIG. 2;

FIG. 6 illustrates a variation of the inflation spacer.

REFERENCE NUMERALS

Figure 4:
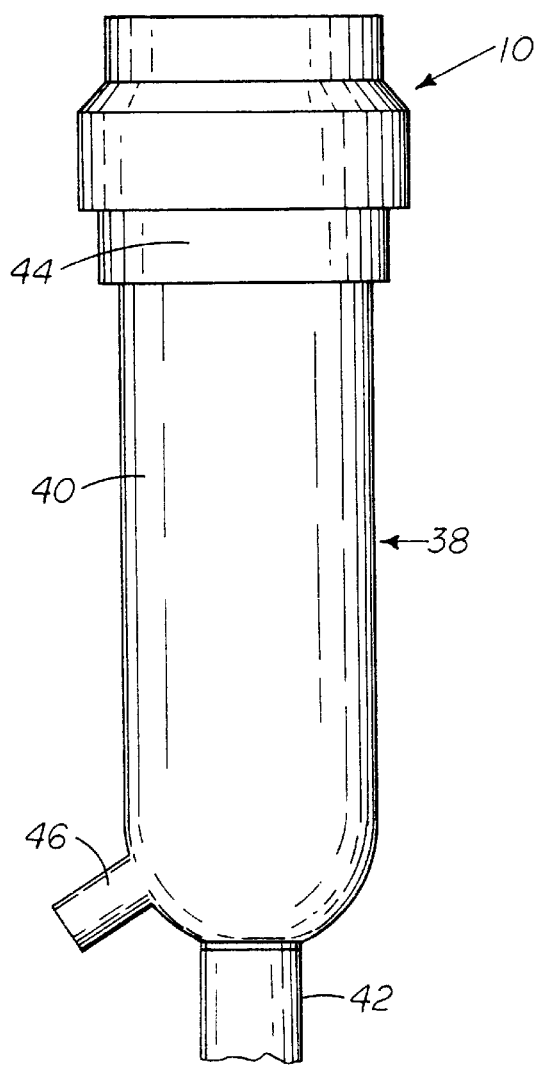
FIG. 4 illustrates an elevational view of a teat cup inflation and shell, equipped with an inflation spacer.

10 inflation spacer
12 central bore
14 upper-body wall
16 lower-body wall
18 upper rim
20 midpoint flange
22 upper peripheral edge
24 lower rim
26 inside upper body wall
28 inflation plate
30 flexible tabs
32 spacer teat-receiving opening
34 inside lower body wall
36 inflation sleeve
38 teat cup
40 shell
42 inflation
44 inflation head
46 nipple
48 inflation teat-receiving opening
50 teat
52 udder
54 milk canal
56 clip

DESCRIPTION OF THE PREFERRED EMBODIMENT

Referring to FIGS. 1 and 2, there is shown a side elevational view and a cross-sectional view of an inflation spacer 10 in accordance with the present invention. The inflation spacer 10 comprises a central bore or aperture 12, a cylindrical shaped upper-body wall 14, and a larger diameter lower-body wall 16. Beginning at rim 18, the upper body wall 14 extends downward to a midpoint flange 20, thereafter flaring outwardly and downwardly to upper peripheral edge 22 of lower body 16, then extending downward and terminating at lower rim 24.

The central bore 12 of the inflation spacer is shown by the cross-sectional view as shown in FIG. 2. The circumference of the inside upper body wall 26 remains consistent extending from the upper rim 18 downward to near an inflation plate 28. Flexible tabs 30 are attached to the inside upper body wall 26 at, or near, a point midway down from the upper rim 18 to the inflation plate 28. The tabs 30 are spaced equi-distant around the circumference of the inside upper body wall 26 as shown more specifically in FIG. 3.

Tabs 30 are perpendicular to the inside upper body wall 26 and extend a distance toward the center of the central bore 12, FIG. 2. The inflation plate 28 is positioned perpendicular to the base of the upper body wall 26. The inflation plate 28 forms a spacer teat-receiving opening 32 which is of a smaller diameter than the central bore 12. The bottom of the inflation plate 28 also joins perpendicular with the inside lower body wall 34 to form inflation sleeve 36.

Figure 5:
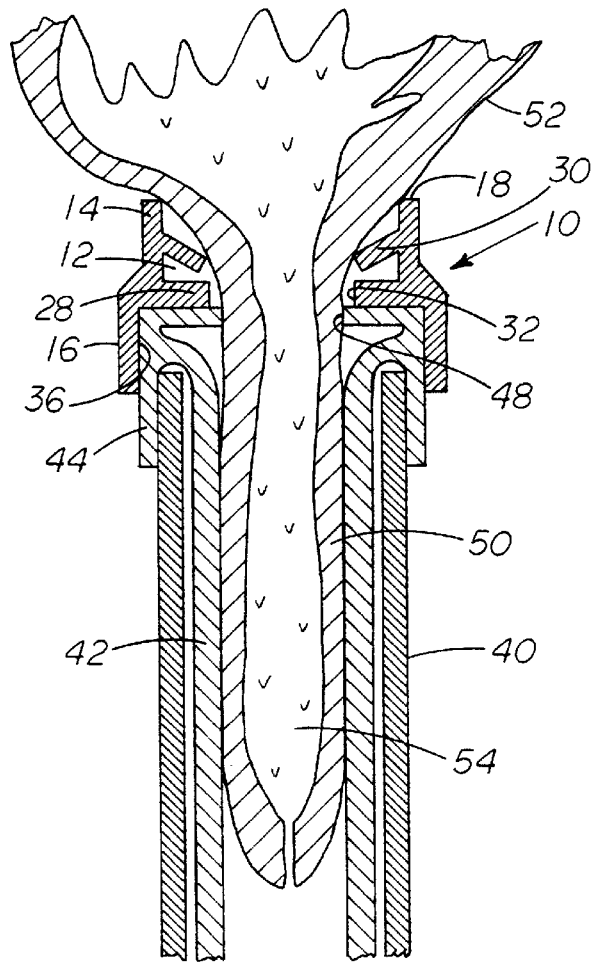
FIG. 5 illustrates a sectional view of the spacer of FIG. 1, and including a partial sectional view of a cow's udder, showing a teat cup inflation and associated spacer in the operative position.

Now turning to FIGS. 4 and 5, there is shown a teat cup designated generally as 38, consisting of a rigid shell 40 and a flexible inflation 42. The inflation head 44 is stretched over the shell end as shown in FIG. 4. Also shown on shell 40 in FIG. 4 is a nipple 46 adapted to receive a pulsator vacuum hose (not shown) of the type employed with a conventional milking machine. The teat cups in FIGS. 4 and 5 are both equipped with an inflation spacer 10 of the present invention. The inflation spacer 10 is properly positioned with the inflation sleeve 36 fitted loosely over the inflation head 44.

FIG. 5 shows the spacer teat-receiving opening 32 in alignment with the inflation teat-receiving opening 48. The sectional view in FIG. 5 shows a more detailed partial sectional view of a teat cup inflation 42, with the inflation spacer 10 attached in the proper operative position while attached to a cow's teat 50 beneath the udder 52. The milk canal 54 remains open and milk flow is unobstructed because the spacer prevents the inflation from moving upward on the teat 50 where it joins the udder 52. The flexible tabs 30 are shown in a flexed position from being pushed against the teat. In the flexed position, the flexible tabs 30 can only deflect to the extent that they engage with the inflation plate 28.

FIG. 6 shows a variation to the inflation spacer 10. Clip 56 or clips can be provided on the 24 lower rim facing into the central bore 12 to hold the inflation spacer 10 onto the inflation (not shown). The clip 56 is useful in substitution for or in addition to the tabs 30. The lower body 16 can be longer from the upper peripheral edge 22 to the lower rim 24 to allow the clip 56 to hold onto the lower edge of the inflation head 44.

OPERATION OF THE PREFERRED EMBODIMENT

In use, the device is elegantly simple. The milker determines which of the animals needs the use of the device and for which teat or teats. The milker selects the external inflation spacer and places the inflation spacer over the top of the inflation with the inflation head being inserted into the device to the depth of the inflation plate. The inflation plate limits the travel of the inflation head into the device. The inflation with device thereon is then placed on the animal's teat. The device spaces the inflation and prevents the inflation from creeping too close to the udder.

The placement of the inflation spacer in operative position for milking is as follows:

Positioning the inflation sleeve 36 portion of the spacer 10 over the inflation head 44, and attaching the teat cup 38 with spacer 10 attached to the teat 52.

Upon attachment to the teat, the spacer and teat cup are held in place by the milking vacuum which forms a tight seal between the inflation head 44 and the inflation plate 28. The upper rim 18 of the inflation spacer completes the vacuum seal when it comes into contact with the udder 48.

Having described my invention, many modifications thereto will become apparent to those skilled in the art to which it pertains without deviation from the spirit of the invention as defined in the appended claims.

I claim:

1. A device for temporarily spaceably positioning a milking inflation on a teat, the teat being connected to an udder and having a milk canal between the udder and an orifice on the end of the teat, the milk canal having an open flow condition, the inflation having a head, the device comprising:

a monolithic unibody being settable onto a milking inflation, the monolithic unibody having a first end and a second end, one of the first and second ends being fittable near the udder, the monolithic unibody having an aperture through the body from the first end to the second end, the aperture being sized to allow the milk canal to remain in an open flow condition;

a plate extending perpendicularly into the aperture partly closing the aperture,
   the plate being recessed away from one of the first and the second ends,
   the plate fittable over the head of the inflation; and a plurality of flexible tabs extending perpendicularly into the aperture,
   the plurality of flexible tabs being recessed away from the other of the one of the first and second ends, the plurality of flexible tabs being disposed between the other
   of the one of the first and second ends and the plate,
   the plurality of flexible tabs being fittable around the teat, whereby the device spaces the milking inflation lower on the teat.

2. The device according to claim 1 wherein the device is comprised from rubber.

3. The device according to claim 1 wherein the first and second ends are circumferential.

4. The device according to claim 3 wherein the circumferential second end is larger than the circumferential first end.

5. The device according to claim 1 wherein the device is placeable over the inflation.

6. A method for using a device according to claim 1 to improve milk out comprising the following steps:

placing the device over an inflation head; and placing the device and inflation over an animal's teat.

7. The method according to claim 6 further comprising the following steps:

placing the device and inflation over an animal's teat wherein the device is placed proximate the animal's udder.

8. A method for using a device according to claim 1 to improve milk out comprising the following steps:

removing the inflation from an animal's teat; and removing the device from the animal's teat.

9. A device for spaceably positioning a milking inflation on a teat, the teat being connected to an udder and having a milk canal between the udder and an orifice on the end of the teat, the milk canal having an open flow condition, the inflation having a head, the device comprising:

a monolithic unibody having a first end and a second end, one of the first and second ends being
   fittable near the udder, the monolithic unibody having an aperture through the body from the first end to the second end,
   the aperture being sized to allow the milk canal to remain in an open flow condition; and a plate extending perpendicularly into the aperture partly closing the aperture,
   the plate being recessed away from one of the first and the second ends,
   the plate fittable to the head of the inflation.

10. The device according to claim 9 further comprising a clip extending into the aperture from one of the first and second ends, the end being distal from the end fittable near the udder.

11. The device according to claim 10 wherein the clip being lockingly fittable over the milking inflation.

* * * * *

UNITED STATES PATENT AND TRADEMARK OFFICE
CERTIFICATE OF CORRECTION

PATENT NO. : 5,857,424
DATED : January 12, 1999
INVENTOR(S) : Garry Johnston

It is certified that error appears in the above-identified patent and that said Letters Patent is hereby corrected as shown below:

Cover page of patent, item 73 Assignee information, as this patent is not assigned, please delete -- Barbara M. Burns, Ann Arbor, Mich.--.

Signed and Sealed this

Twenty-fifth Day of May, 1999

Attest:

Q. TODD DICKINSON

*Attesting Officer*  *Acting Commissioner of Patents and Trademarks*